US011034003B2

(12) United States Patent
Reynertson, Jr. et al.

(10) Patent No.: US 11,034,003 B2
(45) Date of Patent: Jun. 15, 2021

(54) HOLDING TOOL (71) Applicant: Snap-on Incorporated, Kenosha, WI (US)

(72) Inventors: John Reynertson, Jr., Geneva, FL (US); Donald J. Reynertson, Carol Stream, FL (US); Paul E. Davis, Carol Stream, FL (US)

(73) Assignee: Snap-on Incorporated, Kenosha, WI (US)

( * ) Notice: Subject to any disclaimer, the term of this patent is extended or adjusted under 35 U.S.C. 154(b) by 107 days.

(21) Appl. No.: 15/823,028

(22) Filed: Nov. 27, 2017

(65) Prior Publication Data

US 2018/0154503 A1   Jun. 7, 2018

Related U.S. Application Data (60) Provisional application No. 62/429,174, filed on Dec. 2, 2016.

(51) Int. Cl.
*B25B 23/142* (2006.01)
*B25G 1/08* (2006.01)
(Continued)

(52) U.S. Cl.
CPC .......... *B25B 23/1425* (2013.01); *B25B 15/04* (2013.01); *B25F 1/02* (2013.01);
(Continued)

(58) Field of Classification Search
CPC ....... B25F 1/02; B25B 13/468; B25B 115/04; B25G 1/085; G01L 25/003
(Continued)

(56) References Cited

U.S. PATENT DOCUMENTS 3,869,942 A * 3/1975 DeCaro ................... B25B 21/00
                                                           81/54
4,976,133 A   12/1990 Yokoyama
(Continued)

FOREIGN PATENT DOCUMENTS

CN   202137724 U   2/2012
CN   103507011 A   1/2014
(Continued)

OTHER PUBLICATIONS

UK Office Action for Application No. GB1720015.5, dated Jan. 30, 2019, 3 pages.

(Continued)

*Primary Examiner* — Hadi Shakeri
(74) *Attorney, Agent, or Firm* — Seyfarth Shaw LLP (57) ABSTRACT A holding tool for use in holding a first portion of an item, such as a hydraulic coupling, in a static position, while a torque application tool applies torque and rotates a second portion of the item. The holding tool helps reduce twisting of the first portion relative to the second portion when torque is applied. The holding tool also communicates with a controller when the tool is in use. For example, the tool communicates with the controller in response to a user applying a force to the tool in a direction of the first portion the tool is engaged with. That force releases pressure on a switch that activates a communication signal for communication to the controller. This allows the controller to monitor whether the holding tool was used in conjunction with a torque wrench to tighten the coupling; thereby providing an error reducing function.

3 Claims, 7 Drawing Sheets (51) Int. Cl.
  *B25B 15/04* (2006.01)
  *B25F 1/02* (2006.01)
  *G10L 25/00* (2013.01)
  *B25B 13/46* (2006.01)
  *G01L 25/00* (2006.01)

(52) U.S. Cl.
  CPC ............ *B25G 1/085* (2013.01); *B25B 13/468* (2013.01); *G01L 25/003* (2013.01)

(58) Field of Classification Search
  USPC .................................................. 81/467, 479
  See application file for complete search history.

(56) References Cited

U.S. PATENT DOCUMENTS

| | | | |
|---|---|---|---|
| 4,982,612 | A | 1/1991 | Rittmann |
| 5,557,990 | A * | 9/1996 | Shin ........................ B25B 21/00 81/429 |
| 6,276,243 | B1 | 8/2001 | Jenkins |
| 7,082,865 | B2 | 8/2006 | Reynertson, Jr. |
| 7,392,711 | B2 * | 7/2008 | Hsieh ........................ G01L 5/24 73/862.21 |
| 7,819,025 | B2 | 10/2010 | Coffiand |
| 7,836,968 | B2 * | 11/2010 | Steverding .............. B25B 21/00 173/1 |
| 7,984,657 | B2 | 7/2011 | DeRose et al. |
| 8,281,871 | B2 | 10/2012 | Cutler et al. |
| 8,578,819 | B2 * | 11/2013 | Cheung ................. B67B 7/0405 81/3.2 |
| 8,677,862 | B2 | 3/2014 | Backlund |
| 8,763,720 | B2 | 7/2014 | Moore |
| 8,857,532 | B2 | 10/2014 | Wallgren |
| 8,869,630 | B2 | 10/2014 | Watson et al. |
| 9,157,818 | B2 | 10/2015 | Schultz et al. |
| 9,770,816 | B2 * | 9/2017 | Yokoyama ............... G01B 5/24 |
| 2002/0152849 | A1 | 10/2002 | Jenkins |
| 2003/0094081 | A1 | 5/2003 | Becker et al. |
| 2004/0255733 | A1 | 12/2004 | Reynertson, Jr. |
| 2005/0126351 | A1 | 6/2005 | Becker et al. |
| 2005/0223857 | A1 | 10/2005 | Reynertson et al. |
| 2007/0186688 | A1 | 8/2007 | Hsieh |
| 2010/0170369 | A1 | 7/2010 | Yokoyama et al. |
| 2013/0047799 | A1 | 2/2013 | Gareis |
| 2014/0150568 | A1 | 6/2014 | Delbridge |
| 2014/0165796 | A1 | 6/2014 | Gauthier et al. |
| 2016/0161354 | A1 | 6/2016 | Jiang |

FOREIGN PATENT DOCUMENTS

| | | |
|---|---|---|
| CN | 104133500 | 11/2014 |
| CN | 104143010 A | 11/2014 |
| CN | 104275662 A | 1/2015 |
| CN | 104684692 | 6/2015 |
| CN | 102179791 | 8/2016 |
| DE | 102006013159 | 9/2007 |
| EP | 1775074 | 4/2007 |
| EP | 1998934 | 12/2008 |
| TW | 577371 | 2/2004 |
| TW | 200416115 | 9/2004 |
| TW | 200529989 | 9/2005 |
| TW | I265845 B | 11/2006 |
| TW | M381484 | 6/2010 |
| TW | 201207364 | 2/2012 |
| TW | 201224416 | 6/2012 |
| TW | 201435765 | 9/2014 |
| TW | 201620682 | 6/2016 |
| WO | 0064640 | 11/2000 |
| WO | 2007112303 | 10/2007 |
| WO | 2008034262 | 3/2008 |
| WO | 2016062915 | 4/2016 |
| WO | 2016100213 | 6/2016 |

OTHER PUBLICATIONS

Park Tool, Torque Specifications and Concepts, Aug. 25, 2015, 13 pages.
Sturtevant Richmont, When Tool Failure is not an Option, Apr. 26, 2016, 16 pages.
Taiwan Office Action for Application No. 106142341 dated Jun. 26, 2018, 10 pages.
Canadian Office Action for Application No. 2,925,579 dated Jun. 23, 2016, 3 pages.
Taiwan Office Action and Search Report for Application No. 103115640 dated Oct. 21, 2015, 6 pages.
TW Office Action for Application No. 107139259 dated May 7, 2019, 4 pages.
CN Office Action for Application No. 201711261048.8 dated Mar. 4, 2019, 7 pages.
Combined Search and Examination Report for UK Application No. GB1720015.5 dated May 23, 2018, 8 pages.
Australian Examination Report No. 1 for Application No. 2017268673 dated Nov. 16, 2018, 4 pages.
Canadian Office Action for Application No. 2,987,501 dated Nov. 14, 2018, 3 pages.
Taiwan Office Action for Application No. 106142341 dated Dec. 4, 2018, 2 pages.
Torque Specifications and Concepts, dated Aug. 25, 2015, 13 pages.
Sturtevant Richmont, "When Tool Failure is not an Option," dated Apr. 26, 2016, 16 pages.
United Kingdom Combined Search and Examination Report for Application No. GB19070861, dated Nov. 7, 2019, 5 pages.
Chinese Office Action for Application No. 201711261048.8 dated Nov. 4, 2019, 6 pages.
Chinese Office Action for Application No. 201711261048.8 dated Jun. 2, 2020, 4 pages.
Australian Examination Report No. 1 for Application No. 2019264654 dated Oct. 15, 2020, 5 pages.
Chinese Office Action for Application No. 201711261048.8 dated Dec. 31, 2020, 6 pages.

* cited by examiner

HOLDING TOOL

CROSS-REFERENCE TO RELATED APPLICATIONS

This application is a continuation of and claims the benefit of U.S. Provisional Patent Application Ser. No. 62/429,174, filed Dec. 2, 2016, entitled Torque Holding Wrench, the contents of which are incorporated herein by reference in their entirety.

TECHNICAL FIELD OF THE INVENTION

The present invention relates generally to torque application tools. More particularly, the present invention relates to a tool for holding a portion of a work piece while torque is applied to a second portion of the work piece.

BACKGROUND OF THE INVENTION

In many industrial applications, the tightening of items with threaded fasteners to a specific degree or torque is of critical importance. For example, in the assembly of automobiles or aircraft, it is important that nuts, bolts, screws, lugs, and the like (which, for brevity, will all be referred to as "fasteners") are sufficiently tightened to ensure that the resulting assembly functions properly, not only at initial use, but over the long term. Over-tightening, however, may strip the threads or cause vibrational problems in the assembly.

Further, it is useful to maintain portions of the item being connected, such as, for example, a hydraulic hose at a specified position when a torque wrench is used to install such connectors, couplings or fittings. This ensures proper positioning of the hydraulic hose/pipe for operation and reduces twisting forces from being applied to the hose, coupling, or fitting. Such twisting forces can cause damage to the hose/pipe and reduce the life of the coupling or fitting. For example, a twist of about seven (7) degrees can reduce hose service life by up to about 90%.

SUMMARY OF THE INVENTION

The present invention broadly comprises a tool, such as a holding tool, that may be used in parallel with a torque application tool, such as a torque wrench. The holding tool is used to hold a first portion of an item being fastened, such as a hydraulic hose, in a static position, while the torque application tool applies torque and rotates a second portion of the item. The holding tool helps prevent application of torque to the first portion of the item, thus preventing twisting of a hose, pipe, and/or coupling.

In an embodiment, the holding tool also wirelessly communicates with a controller when the tool is in use. For example, the tool may indicate that it is in use. The tool communicates with the controller in response to a user applying a thrust or force to the tool in a direction of the coupling the tool is engaged with. That thrust releases pressure on a switch that activates a communication signal, such as a coded radio signal, for communication to the controller. This allows the controller to monitor whether the holding tool was used in conjunction with a torque application tool.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention broadly comprises a tool, such as a holding tool, that may be used with a torque application tool, such as a torque wrench, when connecting an item having first and second portions. The first portion of the item may be a hose or other device where rotation is not desired. The second portion of the item may be a coupling where torque application and rotation is not desired. For example, the item may be a hydraulic brake hose that includes a hose as the first portion and a rotatable coupling as the second portion. Thus, in an embodiment, the present invention allows torque to be applied to the second portion of the item, and thus causes the second portion to rotate, while the first portion of the item remains static.

The holding tool helps prevent twisting of a hose, pipe, and/or the first portion of the item while torque is applied to the second portion. In an embodiment, the holding tool also wirelessly communicates with a controller when the tool is in use. For example, the tool may indicate that it is in use. The tool communicates with the controller in response to a user applying a thrust or force to the tool in a direction of the coupling the tool is engaged with. That thrust releases pressure on a switch that activates a communication signal, such as a coded radio signal, for communication to the controller. This allows the controller to monitor whether the holding tool was used in conjunction with a torque application tool.

For example, the controller may be used to monitor that the holding tool is engaged with a coupling during the torqueing operation, that the holding tool is fully engaged until after a target torque value has been attained (as indicated by a torque wrench in communication with the controller), and that the target torque value or target torque and angle values have been attained (as indicated by a torque wrench in communication with the controller). If the above criteria are not met, the controller may indicate that the operation has not been performed properly, and should be completed again.

Figure 1:
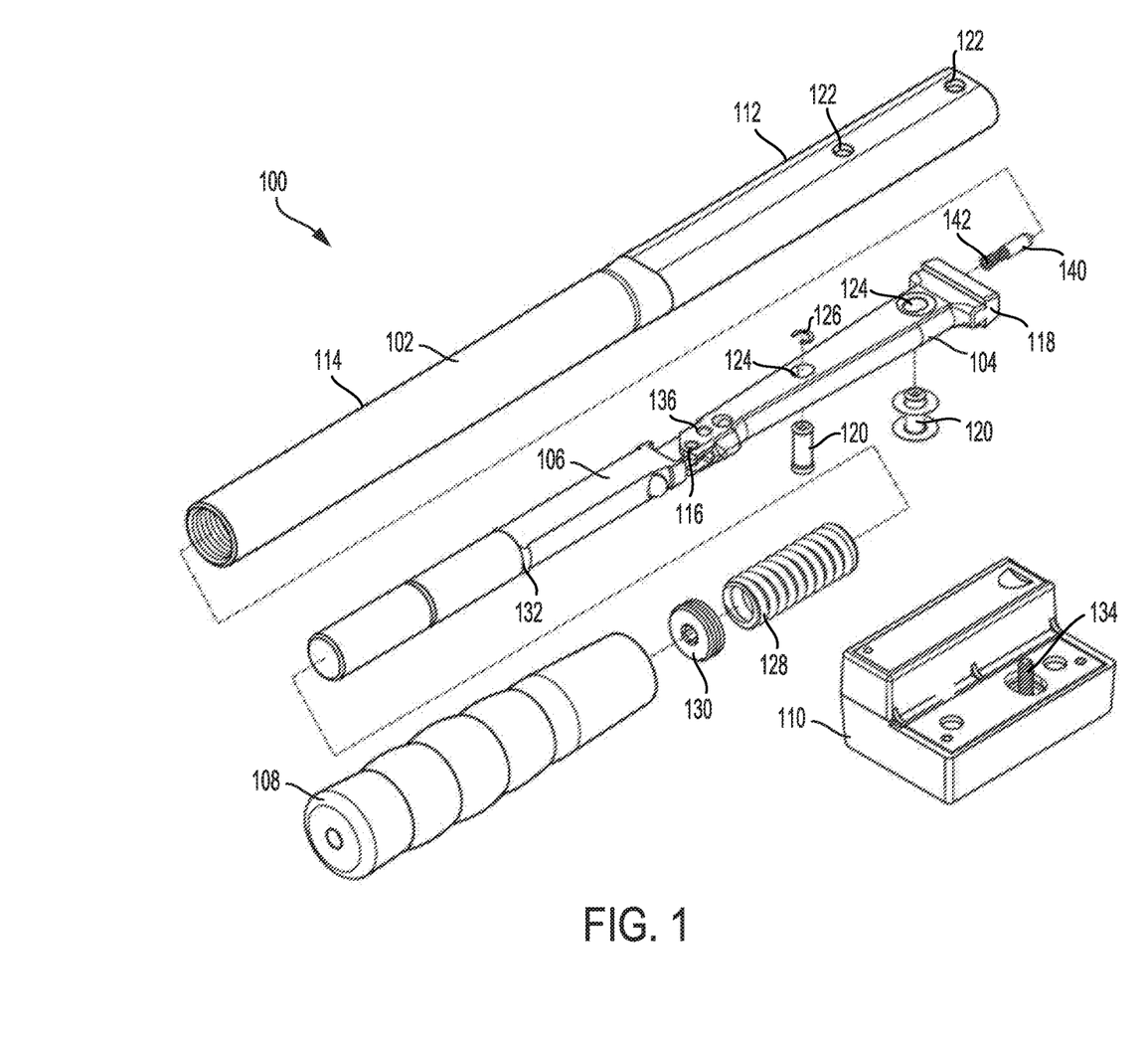
FIG. 1 is an exploded perspective view of a holding tool according to an embodiment of the present invention.
Figure 2:
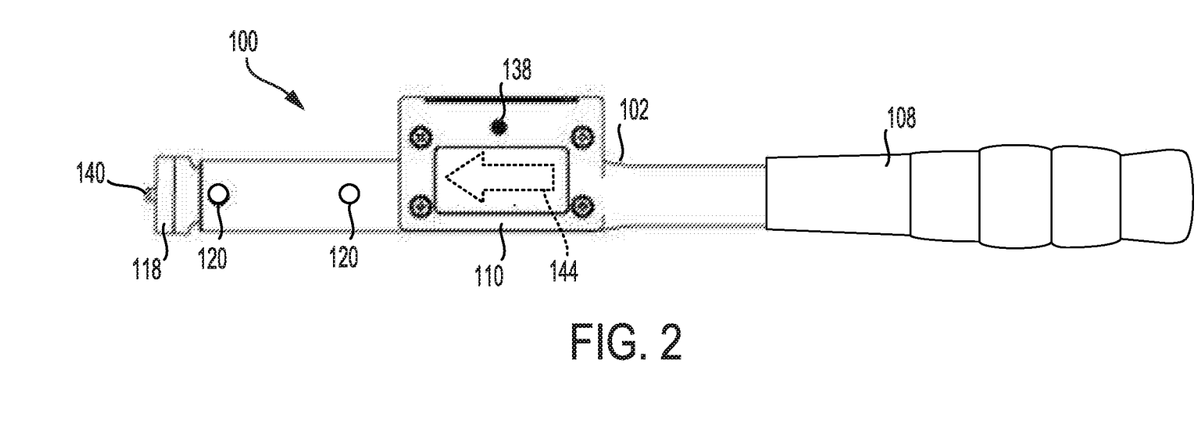
FIG. 2 is a first side view of the holding tool according to an embodiment of the present invention.
Figure 3:
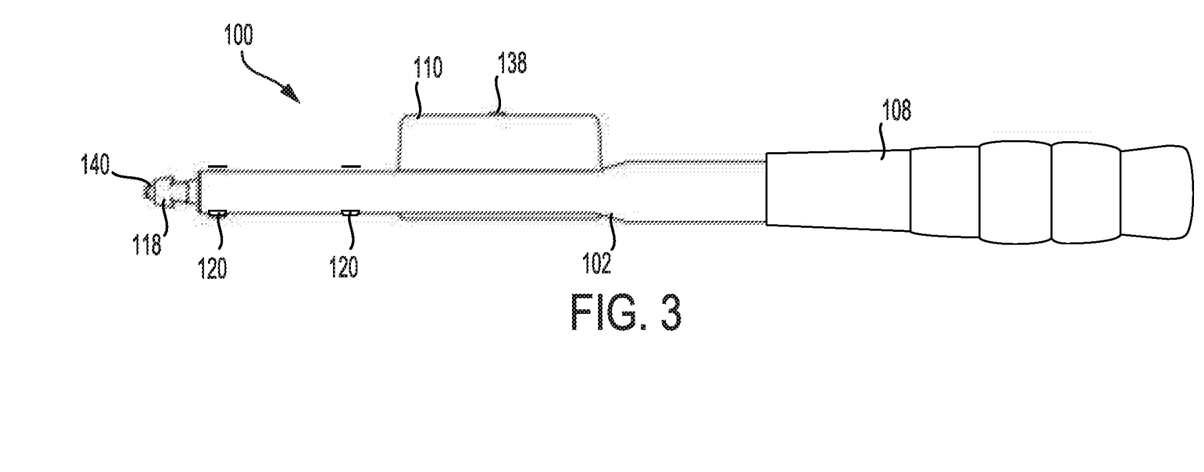
FIG. 3 is a second side view of the holding tool of FIG. 2.

Referring to FIGS. 1-3, a tool 100, such as a holding tool, includes a housing 102, a transducer beam 104, a torque block 106, a handle 108, and an interface module 110. The housing 102 includes a first housing portion 112 proximal to a first end and a second housing portion 114 proximal to a second end. The first housing portion 112 is hollow and is adapted to receive a transducer beam 104. Similarly, the second housing portion 114 is hollow and is adapted to receive the torque block 106. As illustrated, the first housing portion 112 has an oblong cross-sectional shape, and the second housing portion 114 has a circular cross-sectional shape. However, the first and second housing portions 112, 114 may have other geometrical cross-sectional shapes.

The transducer beam 104 and torque block 106 are coupled together, for example via one or more fasteners or pins 116, and are disposed in the housing 102, with a head 118 of the transducer beam 104 positioned outside of the housing 102 proximal to the first end of the housing 102. The transducer beam 104 is coupled to the housing 102 by pins 120. The pins 120 respectively extend through apertures 122 in the housing 102, and apertures 124 in the transducer beam 104. The pins 120 may also be secured in place using one or more respective retaining rings 126.

A spring 128 is disposed in the housing 102 and around the torque block 106, and the handle 108 is disposed on and coupled to the second end of the housing 102. One or more spacers, such as washers 130, may be disposed between the spring 128 and an internal end of the handle 108. The torque block 106 may also include a stop 132, formed as a ledge, that prevents the spring 128 from traveling in a direction towards the transducer beam 104. The spring 128 may abut the stop 132, and the washers 130. The spring 128 provides a bias force to the torque block 106, and thereby the transducer beam 104, in a direction of the head 118. This cause the head 118 to extend from the first end of the housing 102.

The interface module 110 may include a switch 134, and the interface module, may be coupled to the housing 102, and extend through an aperture 136 in the torque block 106 and transducer beam 104. As illustrated, the apertures 124 in the transducer beam 104 have an oblong shape. This allows the torque block 106 and transducer beam 104 to move within the housing 102. As described above, the spring 128 provides a bias force to the torque block 106, and thereby the transducer beam 104, in a direction of the head 118. This also biases the switch 134 into an OFF position. When force is applied to the head 118 in a direction towards the handle 108 (or a force is applied to the handle 108 in a direction (illustrated as arrow 144) towards the head 118), the oblong shape of the apertures 124 allow the transducer beam 104 and torque block 106 to move against the bias force of the spring 128 in a direction towards the handle 108. This movement releases the bias force applied to the switch 134, and allows the switch 134 to move to an ON position. In the ON position, the interface module 110 transmits a signal indicating that the tool 100 is in use, and an indicator 138 of the interface module 110 is activated. The indicator 138 may be a light that is illuminated to indicate to a user that the tool 100 is in use and the signal is being transmitted. Using thrust force to activate the tool 100 is similar to using a screwdriver. This helps focus the user/operator to hold the hose/pipe, or coupling in a static position while a torqueing operation is performed with a separate torque application tool. For example, the tool 100 may be used to hold a first portion of an item in a static position, while the torque application tool is used to apply torque to a second portion of the item. The tool 100 may also be used to hold a first coupling in a static position, while the torque application tool is used to apply torque to a second coupling.

The head 118 of the tool 100 is adapted to receive and couple to varying different interchangeable tool heads. For example, the head 118 may be shaped and adapted to engage a corresponding female connection of an interchangeable tool head. The head 118 may also include a pin 140 and spring 142 disposed in and coupled to the head 118. For example, the pin 140 and spring 142 may be disposed in a blind hole in the head 118, and the pin 140 is biased outwardly by the spring 142. The interchangeable nature of the head 118 and tool heads allows the tool 100 to be adapted to engage varying types of fittings and fasteners. Examples of tool heads that may be coupled to the head 118 are illustrated in FIGS. 4-14.

Figure 4:
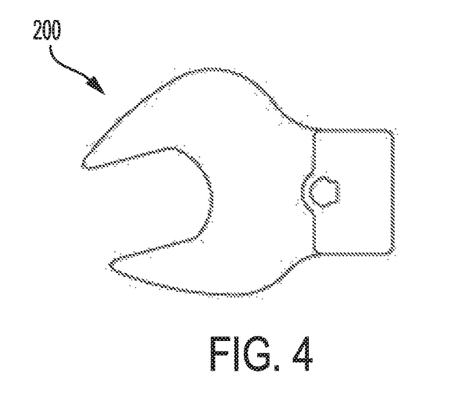
FIG. 4 is a first side view of an open end type tool head according to an embodiment of the present invention.
Figure 5:
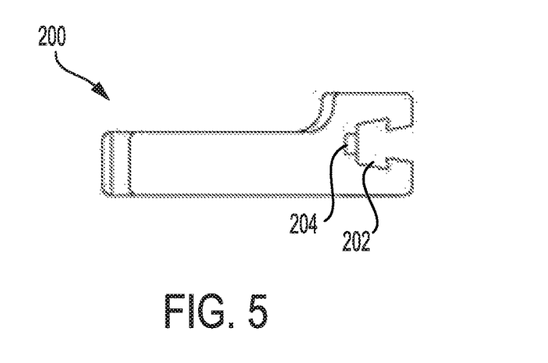
FIG. 5 is a second side view of the tool head of FIG. 4.

Referring to FIGS. 4 and 5, a tool head 200 is illustrated. The tool head 200 is an open end type wrench head, and includes channels 202 and 204 adapted to respectively engage the head 118 and pin 140. To couple the tool head 200 to the head, the pin 140 may be pushed inwardly against the bias of the spring 142, and the head 118 slid into the channel 202 until the pin 140 is pushed into the channel 204 by the spring 142.

Figure 6:
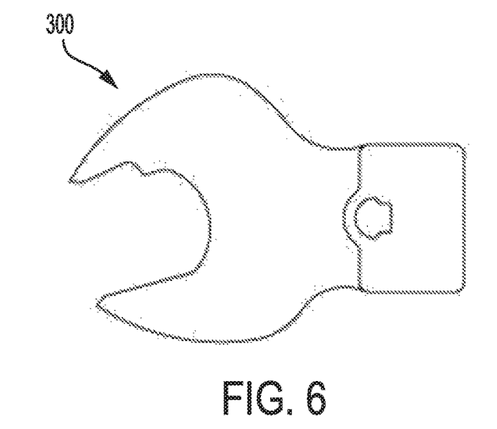
FIG. 6 is a first side view of a ratcheting open end type tool head according to an embodiment of the present invention.
Figure 7:
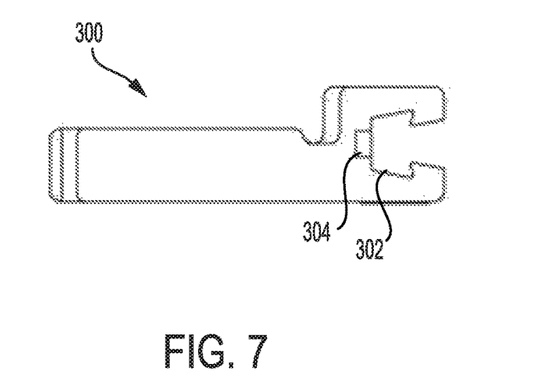
FIG. 7 is a second side view of the tool head of FIG. 6.
Figure 8:
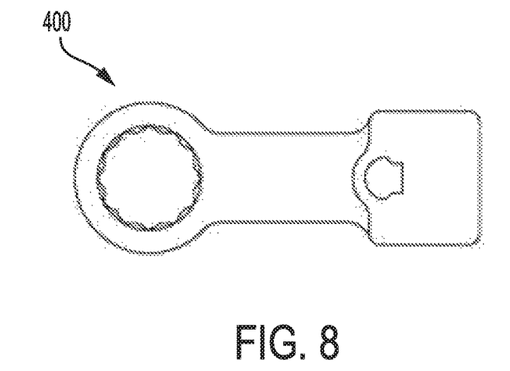
FIG. 8 is a first side view of a box head type tool head according to an embodiment of the present invention.
Figure 9:
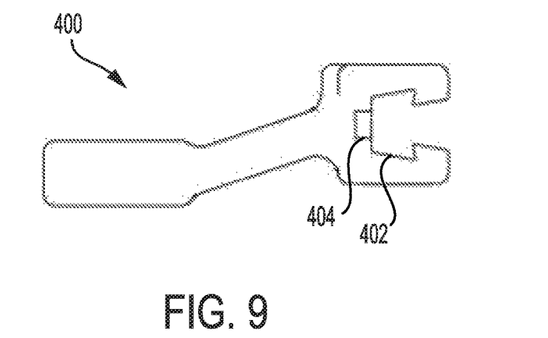
FIG. 9 is a second side view of the tool head of FIG. 8.
Figure 10:
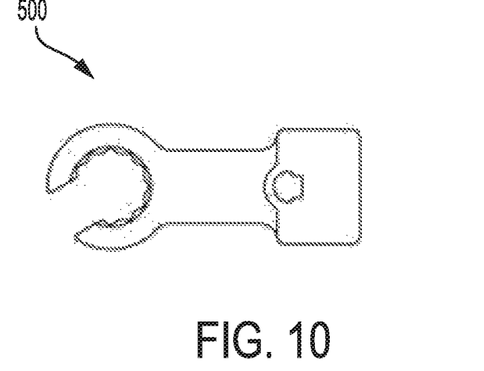
FIG. 10 is a first side view of a flare nut type tool head according to an embodiment of the present invention.
Figure 11:
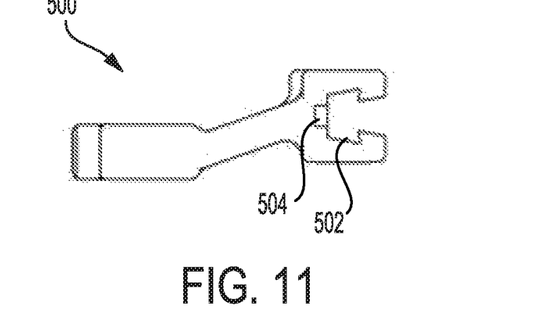
FIG. 11 is a second side view of the tool head of FIG. 10.
Figure 12:
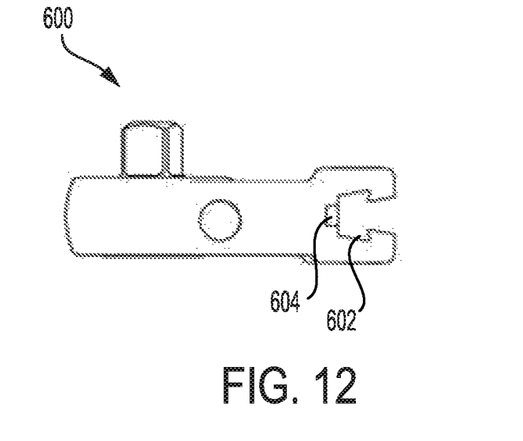
FIG. 12 is a side view of a square drive ratchet type tool head according to an embodiment of the present invention.
Figure 13:
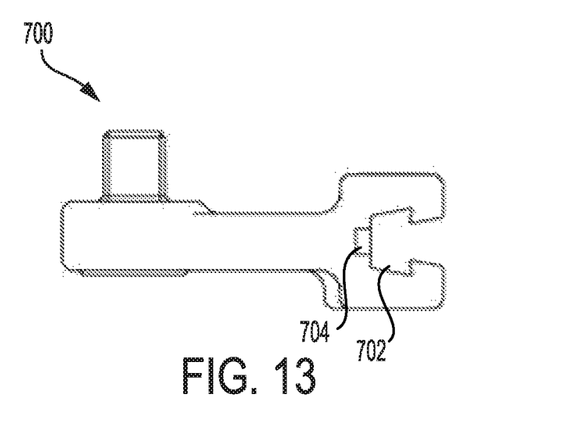
FIG. 13 is a side view of a square drive type tool head according to an embodiment of the present invention.
Figure 14:
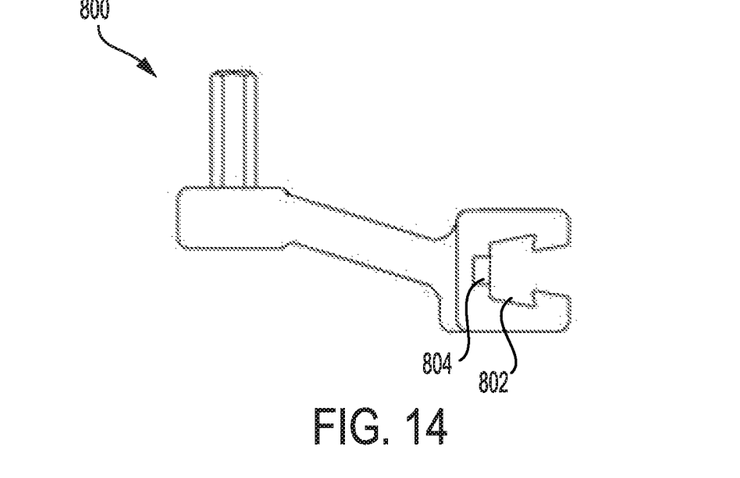
FIG. 14 is a side view of a hex drive type tool head according to an embodiment of the present invention.

Referring to FIGS. 6 and 7, a tool head 300 is illustrated. The tool head 300 is a ratcheting open end type wrench head, and includes channels 302 and 304 adapted to respectively engage the head 118 and pin 140. FIGS. 8 and 9 illustrate a box head type of wrench head 400 that includes channels 402 and 404 adapted to respectively engage the head 118 and pin 140. FIGS. 10 and 11 illustrate a flare head type of wrench head 500 that includes channels 502 and 504 adapted to respectively engage the head 118 and pin 140. FIG. 12 illustrates a square drive ratchet type of wrench head 600 that includes channels 602 and 604 adapted to respectively engage the head 118 and pin 140. FIG. 13 illustrates a square drive type of wrench head 700 that includes channels 702 and 704 adapted to respectively engage the head 118 and pin 140. Similarly, FIG. 14 illustrates a hex drive type of wrench head 800 that includes channels 802 and 804 adapted to respectively engage the head 118 and pin 140. It should be appreciated that any type of tool head can be adapted to include channels that respectively engage the head 118 and pin 140. Thus, the tool 100 can be coupled with any type of tool head to suit a particular need or application.

Figure 15:
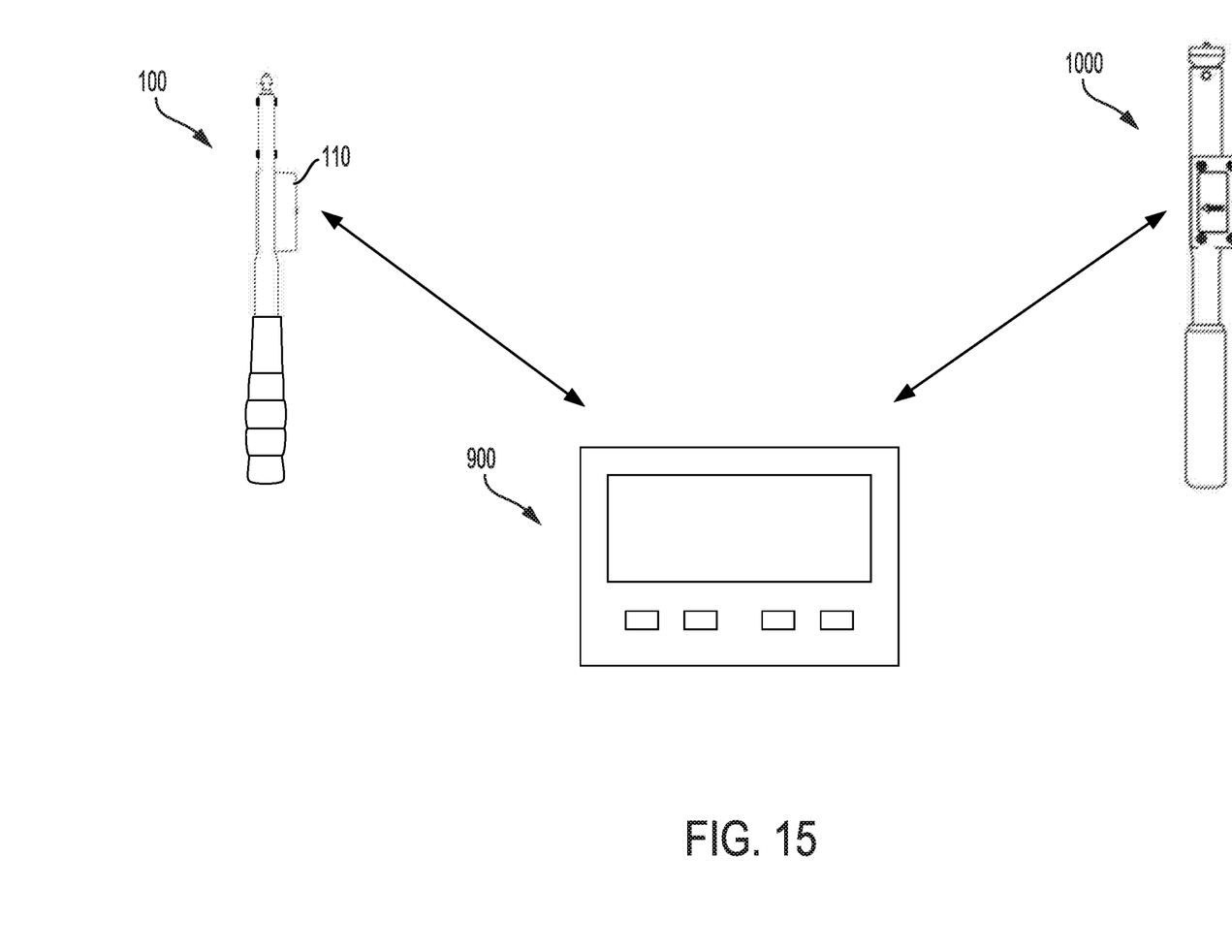
FIG. 15 is an exemplary network diagram according to an embodiment of the present invention.

Referring to FIG. 15, the interface module 110 on the tool 100 may be in communication with a controller 900, when the interface module 110 in in the ON position. A torque wrench 1000 may also be in communication with the controller 900. The use of the tool 100, torque wrench 1000, and controller 900 together provide an error reducing function. For example, when tightening a hose/pipe or coupling, such as a hydraulic hose, hydraulic coupling connection, or other connection that requires a counter torque reaction, the tool 100 may be used to provide the counter torque. During use, a user engages the tool 100 with a first portion of an item that is to be held stationary, and engages the torque wrench 1000 with a second portion of the item that is to be torqued or rotated. Both of the tool 100 and the torque wrench 1000 may be in communication with the controller 900. For example, when a thrust force is applied to the tool 100, such as the handle in a directions towards the head of the tool 100, the interface module 110 is turned ON. The torque wrench 1000 may be in communication with the controller 900 and transmit torque and/or angle information to the controller 900.

The controller 900 receives the signals from the tool 100 and torque wrench 1000 and monitors the tightening operation. For example, the controller 900 records and monitors that both the tool 100 and the torque wrench 1000 are in operation at the same time, and that the tool 100 is engaged prior to, during, and after the torque wrench 1000 is used. The tool 100 may be paired to the torque wrench 1000 prior to use to assist the controller 900 in identifying that both of the tool 100 and the torque wrench 1000 were used. By ensuring that both of the tool 100 and the torque wrench 1000 were used together, the controller 900 provides an error reducing function to assist in preventing hoses/pipes from being twisted and/or connections misaligned, which could cause rework or increased failure or warranty costs.

Figure 16:
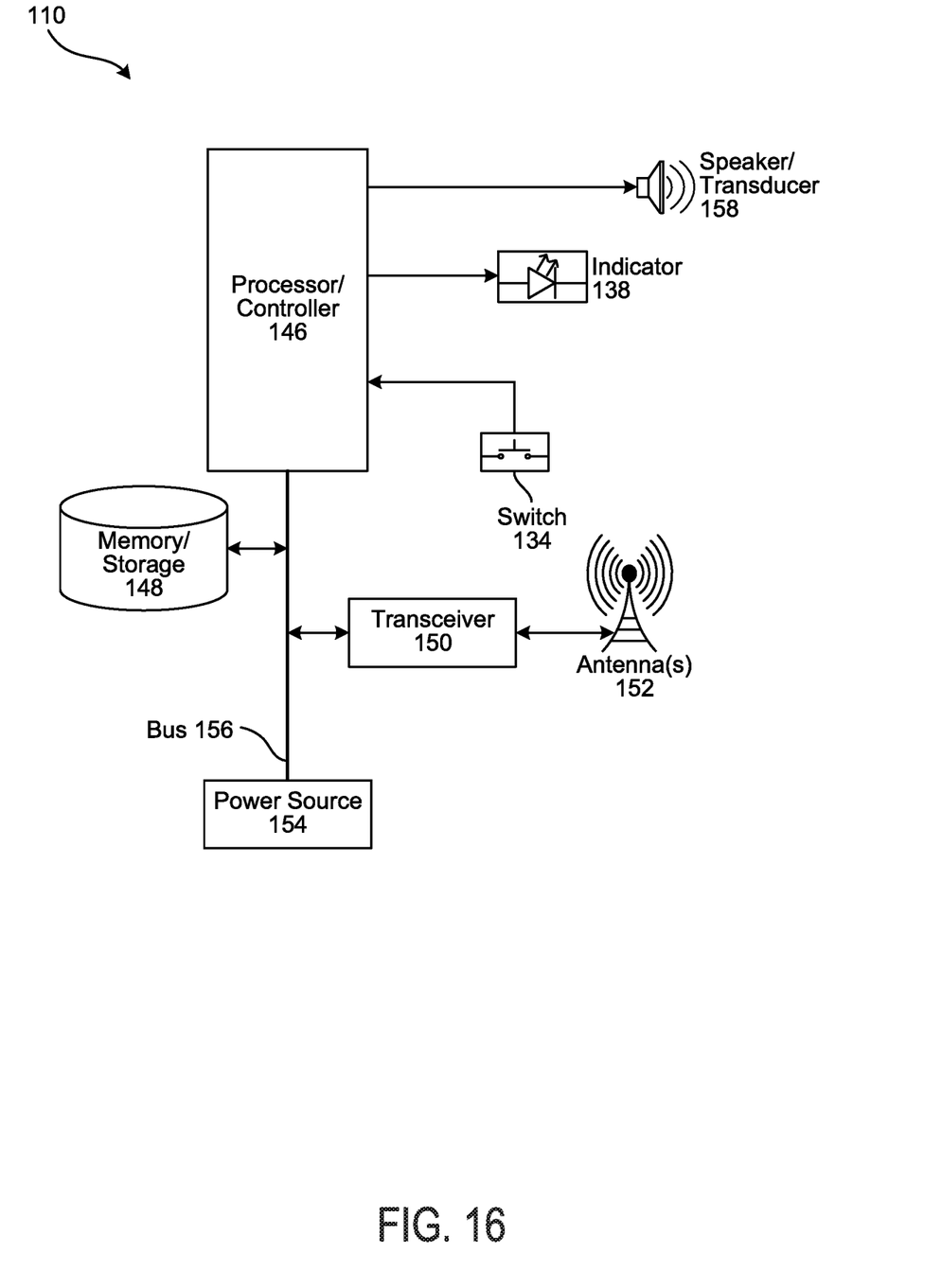
FIG. 16 a block diagram conceptually illustrating examples of electronic components of a holding tool according to an embodiment of the present invention.

To facilitate communication with the controller 900, the interface module 110 of the tool 100 may include various electronic components. For example, referring to FIG. 16, the interface module may include a processor 146, memory/storage 148, transceiver 150, antenna 152, power source 154, switch 134, and indicator 138. The processor 146 may include a central processing unit (CPU) for processing data and computer-readable instructions. The processor 146 may retrieve instructions from memory/storage 148 via a bus 156, using the memory/storage 148 for runtime temporary storage of instructions and data. The memory/storage 148 may include volatile and/or nonvolatile random access memory (RAM). While components are illustrated in FIG. 16 as being connected via the bus 156, components may also be connected to other components in addition to (or instead of) being connected to other components via the bus 156.

The memory/storage 148 stores the instructions, including instructions to manage communications with the controller 900. The memory/storage 148 may include one-or-more types volatile and/or non-volatile solid-state storage, such as flash memory, read-only memory (ROM), magnetoresistive RAM (MRAM), phase-change memory, random access memory (RAM) etc.

Instructions for operating the tool 100 and its various components may be executed by the processor 146. The computer instructions may be stored in a non-transitory manner in non-volatile memory/storage 148, or an external device. Alternatively, some-or-all of the executable instructions may be embedded in hardware or firmware in addition to or instead of software.

The tool 100 may include multiple input and output interfaces. These interfaces include the transceiver 150, switch 134, and indicator 138. The tool 100 may also include a speaker or audio transducer 158, and/or additional devices, such as a haptic feedback device, display, etc. These devices may provide an indication when the interface module 110 is turned ON.

Instructions executed by the processor 146 receive data from the input interfaces, such as the switch 134. From that data, the processor 146 may determine various information, such as that the tool 100 is being used, and the switch in in the ON position, and optionally, the duration that the tool 100 is in use. The data and information can be logged in real time or at a predetermined sampling rate and stored in a memory/storage 148. The data and information may also be transmitted to the controller 900 for further analysis and review.

The transceiver 150 may include a transmitter, a receiver, and associated encoders, modulators, demodulators, and decoders. The transceiver 150 manages the communication link, establishing the communications link with the controller 900 via one-or-more antennas 152 embedded in the tool 100, and enables unidirectional or bidirectional communication between the processor 146 and the controller 900. The communications link may be a direct link between the tool 100/interface module 110 and the controller 900, or may be an indirect link through one-or-more intermediate components, such as via a Wi-Fi router or mesh connection.

The tool 100/interface module 110 also includes a power source 154 to power the processor 146, the bus 156, and other electronic components. For example, the power source 154 may be one-or-more batteries. However, the power source 154 is not limited to batteries, and other technologies may be used, such as one or more fuel cells, or solar cells, for example.

The controller 900 may be a computer, or other device in a network. In an example, the controller 900 includes a processor, communications circuitry (such as a transceiver and antenna), memory, storage, input and output devices (such as buttons, knobs, etc.), and a display screen, as known in the art. The controller 900 may be capable of interfacing with a variety of tools to set parameters, job tasks, etc. For example, parameters or jobs can be input, transmitted, and assigned to tools, while the controller 900 displays the required work and progress of the work to the user. As the user works through a task, the tools and controller 900 provide auditory, tactile, and visual guidance or progress, and results.

The torque wrench 1000 may also include a processor, communications circuitry (such as a transceiver and antenna), memory, storage, input and output devices (such as buttons, knobs, etc.), and torque and/or angle sensors, as known in the art. The torque sensor may include, for example, one-or-more of a torque transducer, a strain gauge, a magnetoelastic torque sensor, and a surface acoustic wave (SAW) sensor. The angle sensors may include, for example, one-or-more of a rotational angle sensor and an electronic gyroscope (such as a two-or-three axes gyroscope). Instructions executed by the processor receive data from the sensors, such as torque and angle values. From that data, the processor may determine various information, such as the duration and amount of torque that has been or should be applied to a work piece. The sensor data and information may then be transmitted to the controller 900, in real time or a predetermined intervals.

Figure 17:
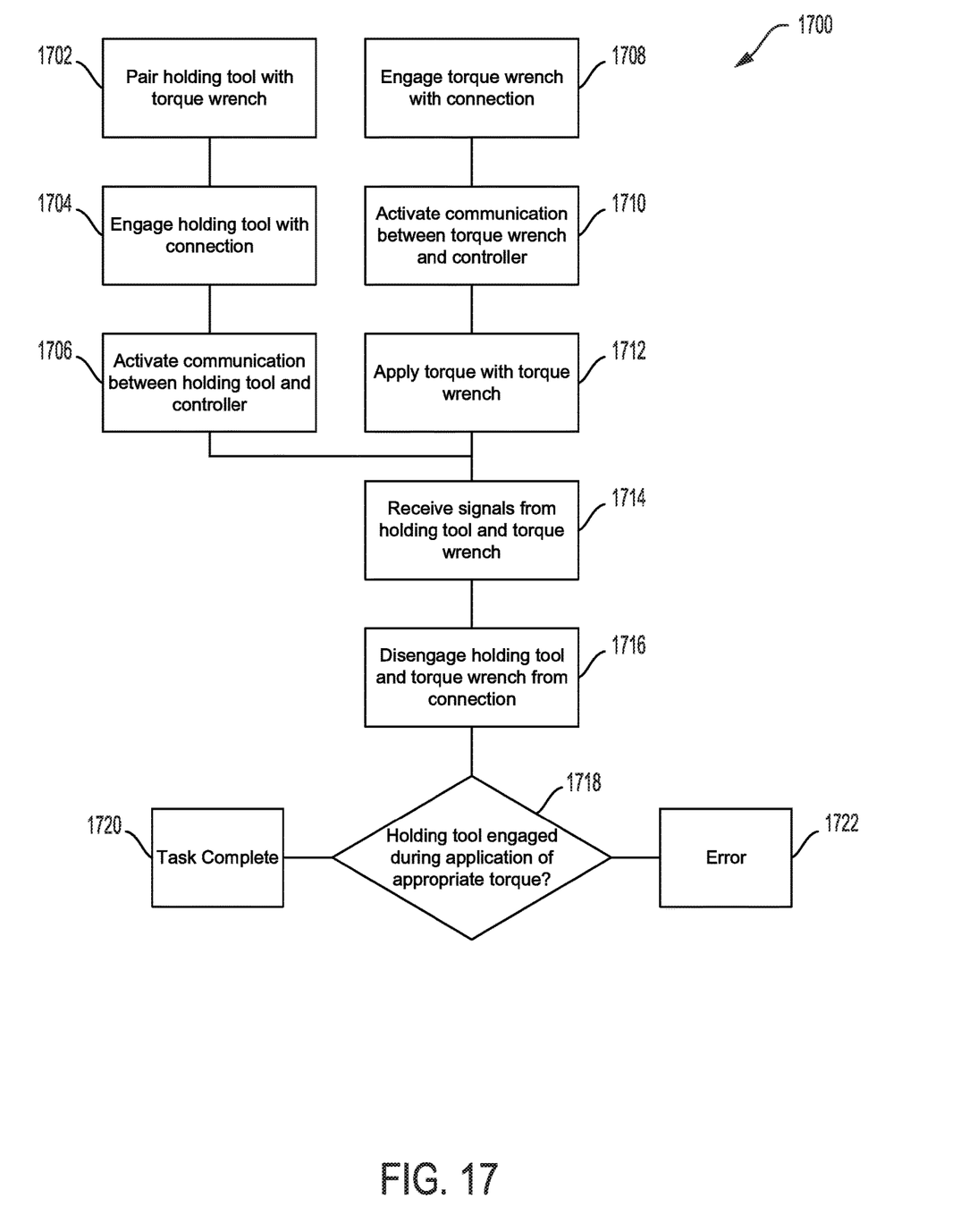
FIG. 17 is process flow diagram of a method according to an embodiment of the present invention.

FIG. 17 is a process flow diagram illustrating a process 1700 according to an aspect of the present invention. The holding tool 100 may be paired with a torque wrench, such as torque wrench 1000, illustrated as block 1702. This pairing may be performed by a user via the controller 900.

The tool 100 may then be engaged with a coupling (such as a first portion of a coupling, a first coupling, connection, fitting, or hose, etc.), that is to be held in a static position, illustrated as block 1704. The interface module 110 of the tool 100 is activated (switched to an ON position) in response to a thrust force being applied to the handle of the tool 100 in a direction of the head of the tool 100, and communication between the tool 100 and controller 900 is activated, illustrated as block 1706. The torque wrench 1000 may also be engaged with a second portion of the coupling, a second coupling, connection, fitting, or hose, etc., that is to be rotated, illustrated as block 1708, and communication between the torque wrench 1000 and controller 900 activated, illustrated as block 1710. An appropriate amount of torque may then be applied by the torque wrench 1000, illustrated as block 1712. As torque is applied, the controller 900 may be receiving signals from the tool 100 that the tool 100 is in use, and the torque wrench 1000 of the torque/angle measurements, illustrated as block 1714.

Once the appropriate torque is applied, the tool 100 and torque wrench 1000 may be disengaged with the respective coupling(s), illustrated as block 1716. The controller 900 may then check the information received to determine whether the tool 100 was engaged (or in use) prior to, during, and after the appropriate torque was applied, illustrated as block 1718. If the tool 100 was engaged (or in use) prior to, during, and after the appropriate torque was applied, the task is complete, illustrated as block 1720. However, if the tool 100 was not engaged (or not in use) prior to, during, and after the appropriate torque was applied, the controller 900 may provide an error, illustrated as block 1722, indicating that the task should be redone or rechecked. By ensuring that both of the tool 100 and the torque wrench 1000 were used together, the controller 900 provides an error reducing function to assist in preventing hoses/pipes from being twisted and/or couplings/connections misaligned, which could cause rework or increased warranty costs.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A holding tool comprising:
   a housing having first and second ends;
   a handle coupled to the second end;
   a head extending from the first end;
   a transducer beam disposed in the housing and coupled to the head, the transducer beam including an aperture adapted to allow movement between the transducer beam and the housing;
   a torque block disposed in the housing and coupled to the transducer beam;
   a spring disposed in the housing and around the torque block; and
   an interface module coupled to the housing between the first and second ends, wherein the interface module includes a switch adapted to actuate between ON and OFF positions, and wherein a force applied, by a user, to the handle in a direction towards the head causes movement of the handle and housing with respect to the transducer beam and the torque block and against a bias force of the spring, and wherein the movement causes the switch to actuate from the OFF position to the ON position and causes transmission of a signal including an indication that the switch is in the ON position.

2. The holding tool of claim 1, wherein the interface module includes an indicator adapted to activate when the switch is in the ON position.

3. The holding tool of claim 1, wherein the aperture extends through the transducer beam and is adapted to receive a pin to couple the transducer beam to the housing.

* * * * *